United States Patent [19]

Miokovic

[11] 3,945,221
[45] Mar. 23, 1976

[54] SHAFT COUPLING WITH VARIABLE TIMING

[75] Inventor: Stevan Miokovic, Boulogne-Billancourt, France

[73] Assignee: Regie Nationale des Usines Renault, Boulogne-Billancourt, France

[22] Filed: Jan. 16, 1975

[21] Appl. No.: 541,574

[30] Foreign Application Priority Data
Jan. 21, 1974 France .......................... 74.01886

[52] U.S. Cl. ...................... 64/24; 64/25; 123/90.17
[51] Int. Cl.² ............................................. F16D 3/10
[58] Field of Search ............... 64/24, 23, 17 R, 25; 123/90.17, 90.18, 90.31

[56] References Cited
UNITED STATES PATENTS

| | | | |
|---|---|---|---|
| 1,060,871 | 5/1913 | Wilson | 64/24 |
| 1,922,596 | 8/1933 | Mangold | 64/24 |
| 3,500,976 | 3/1970 | Halley | 64/24 |
| 3,549,071 | 12/1970 | Beery | 64/24 |
| 3,888,216 | 6/1975 | Miokovic | 123/90.17 |

Primary Examiner—Samuel Scott
Assistant Examiner—Randall Heald
Attorney, Agent, or Firm—Fleit & Jacobson

[57] ABSTRACT

The invention relates to a coupling device comprising a sliding member sliding mounted on one driving shaft but adapted to slide axially thereon for varying the angular timing of another driven shaft in relation to said one driving shaft, notably in the case of a valve gear timing system of internal combustion engine. A bevel gear is rotatably mounted integral with said other shaft, at the adjacent end of said one shaft, a pair of bevel-toothed segments meshing with diametrally opposed sectors of said bevel gear and pivotally mounted to a diametral pin carried by said other shaft, each bevel toothed segment being rotatably solid with a lever formed with a fork-shaped cavity for receiving a driving pin carried by said sliding member, the cavities provided for said pair of segments being opposed to each other and formed on either side of said other shaft, whereby the translation of said sliding member is attended by opposite angular movements of said bevel-toothed segments.

5 Claims, 9 Drawing Figures

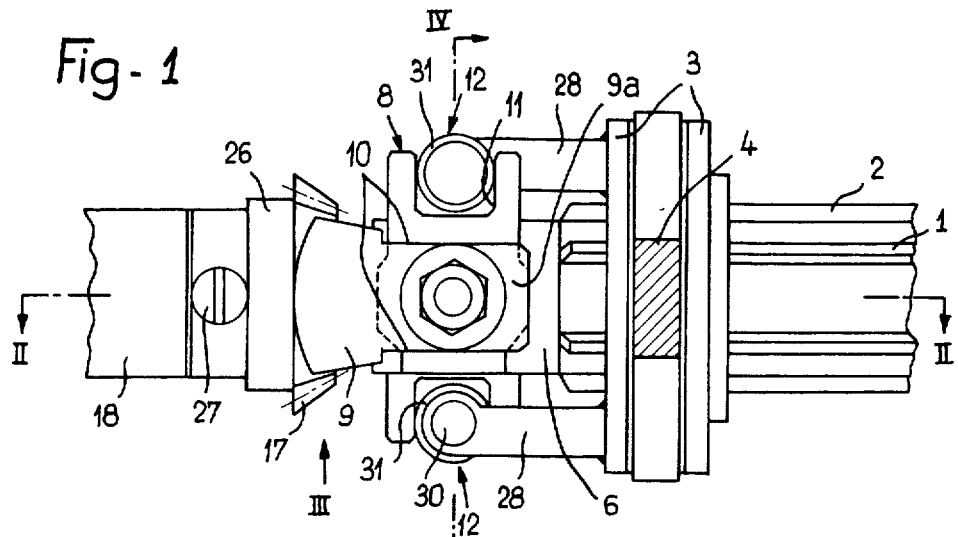
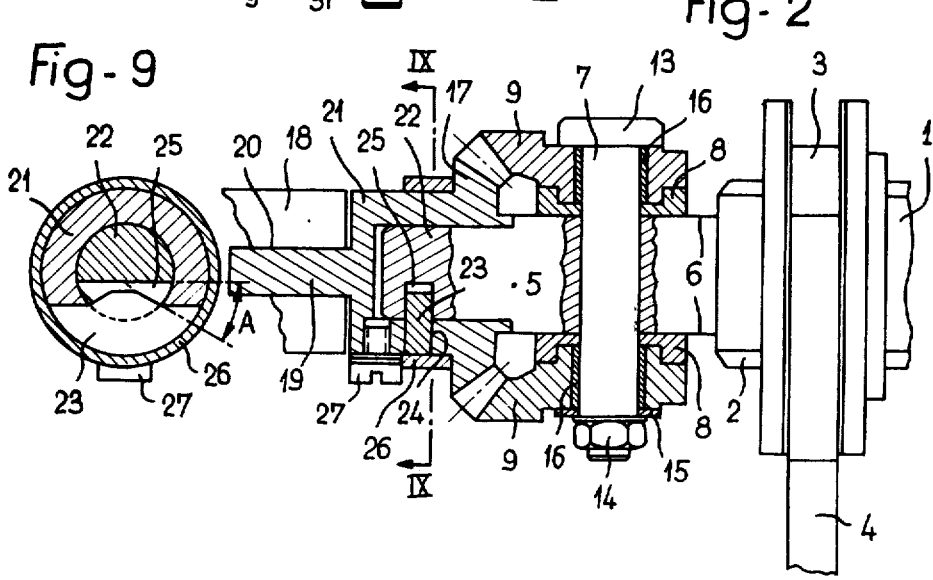

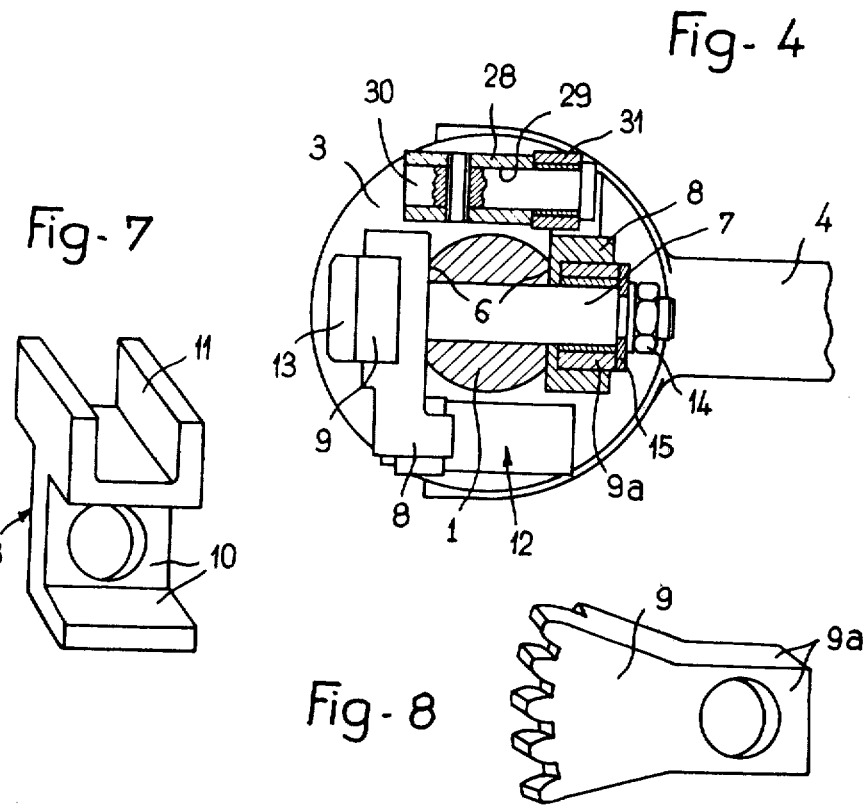
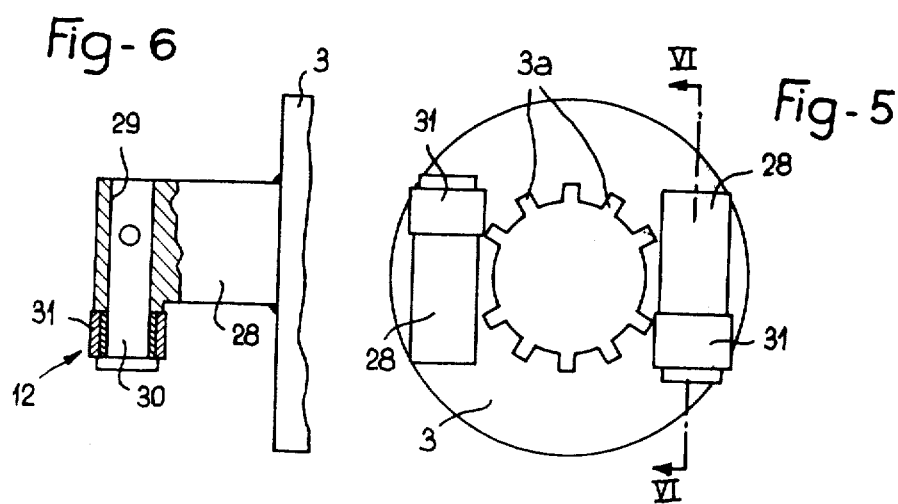

SHAFT COUPLING WITH VARIABLE TIMING

This invention relates to shaft couplings specific reference to a device for coupling together two coaxial rotary shafts while permitting a controlled variation of the relative angular timing of said shafts during their operation, notably for driving the valves of an internal combustion engine. In this last case, the device of this invention is directed to shift angularly the camshaft in relation to the shaft driving same during the engine operation, within certain limits. However, this device is applicable to any other mechanism in which it is desired to vary the angular setting between a driving shaft and a driven shaft during the operation of the mechanism.

In the French patent No. 2.209.395, there has been disclosed a valve gear wherein the timing variation is obtained by using a helical ramp of cam face.

It is a primary object of the present invention to provide a more compact and sturdier device having better wear-resisting properties and a satisfactory response sensitiveness.

Basically, the coupling device according to this invention for operatively interconnecting a pair of coaxial rotary shafts, comprising a sliding member adapted to move axially in relation to said shafts for varying their relative angular setting or timing, is characterised in that it comprises a bevel gear rotatably integral with one shaft, at one end thereof, a pair of toothed segments having bevel teeth in constant meshing engagement with diametrally opposed portions of said bevel gear, said segments being pivoted by means of a diametral pin carried by the other shaft, each bevel-toothed segment being rotatably solid with a lever having a fork-shaped cavity engageable by a driving pin carried by said sliding member. The cavities of said levers are diametrically opposed and disposed on either side of said other shaft, whereby any movement of translation impressed to said sliding member is attended by opposite angular movements of said tapered or bevel toothed segments, thus varying the relative angular timing of said shafts.

A typical form of embodiment of a coupling device according to this invention will now be described by way of example with reference to the attached drawing, in which:

FIG. 1 is a general external view of the device;

FIG. 2 is a section taken along the line II—II of FIG. 1;

FIG. 3 is another external view but taken in the direction of the arrow III of FIG. 1;

FIG. 4 is a fragmentary section taken along the line IV—IV of FIG. 1;

FIG. 5 is an external view of the sliding member, as seen in the direction of the arrow V of FIG. 3;

FIG. 6 is a section taken along the line VI—VI of FIG. 5;

FIG. 7 is a diagrammatic perspective view of one of the control levers;

FIG. 8 is a similar view of one of the toothed segments, and

FIG. 9 is a section taken along the line IX—IX of FIG. 2.

The coupling device illustrated comprises a driving shaft 1 formed with straight splines 2 on which a driving sliding member 3 formed with corresponding splines 3a is adapted to slide. Thus, the sliding member 3 is rotatably driven from shaft 1 through said splines. Furthermore, the sliding member 3 is adapted to be shifted in the axial direction, along said shaft 1, by means of a control fork 4, this fork and sliding member assembly being of conventional design.

The end of shaft 1 which extends beyond said sliding member 3 comprises two opposite flat faces 6 through which a pivot pin 7 extends, as shown. This pin 7 has pivotally mounted thereon a pair of levers 8 and a pair of toothed segments 9 provided with bevel teeth and disposed on either side of shaft 1. Said levers 8 comprise each of the one hand a rectangular cavity 10 in which a matching rectangular shank 9a of the corresponding toothed segment 9 is fitted, and on the other hand a forked portion 11 adapted to receive a driving pin 12 carried by said sliding member 3.

The pivot pin 7 has one end provided with a head 13 and the other end threaded. This other threaded end is engaged by a nut 14 tightened on a washer 15 engaging a shoulder of said pin 7, whereby each assembly comprising a segment 9 and a lever 8 is adapted to pivot about the pin 7 with a moderate coefficient of friction. To this end, self-lubricating bushings 16 are provided between the shanks 9a and pivot pin 7.

The toothed segments 9 are in constant meshing engagement with a bevel gear 17 rotatably solid with the driven shaft 18, said bevel gear comprising to this end a flat shank or tenon 19 engaging a corresponding slot 20 formed in the end portion of driven shaft 18. This bevel gear further comprises a hub 21 centered to the cylindrical end portion 22 of driving shaft 1. The teeth of gear 17 are cut only in the sectors thereof which are adapted to be engaged by said toothed segments 9.

The gear 17 is positioned longitudinally in relation to the toothed segments 9 meshing therewith by means of a key 23 fitted in a corresponding slot 24 formed in the hub 21 of gear 17. The key 23 engages a groove 25 formed in the end portion 22 of driving shaft 1. As shown in FIG. 9, the shape of key 23 is so designed that the key permits a relative angular shift A between the gear 17 and the end 22 of driving shaft 1. The key 23 is retained in its slot 24 and in groove 25 by a ring 26 retained in turn by a screw 27 engaging a tapped hole formed in the gear hub 21.

The driving pins 12 are mounted on a pair of supports 28 secured laterally to the sliding member 3; each support 28 comprises a bore 29 having fitted therein a pin 30 carrying a roller 31 engaging in turn the fork 11 of the corresponding lever 8.

The above described coupling device operates as follows:

When the sliding member 3 is moved in one or the other direction along the driving shaft 1 by actuating the control fork 4, the rollers 31 of driving pin 12 which engage the forks 11 of levers 8 cause the lever 8 and therefore the toothed segments 9 to pivot in opposite directions about the pin 7. The toothed segments 9 cause in turn the bevel gear 17 to pivot about the driving shaft 1 whereby the driven shaft 18 rigid with said gear 17 is shifted angularly in relation to driving shaft 1. Considering the specific application of this coupling device to the drive of an engine camshaft having a variable angular timing, the camshaft would in this case be the driven shaft 18. In this application, the position of fork 4 may, if desired, be controlled automatically by servo means of any suitable and known type, as a function of the speed of the engine driving said shaft 1, and also of the engine depression or of the throttle aperture. This servo action, not within the scope of the present invention, may be obtained through mechanical, hydraulic or electric means.

Although a specific form of embodiment of this invention has been described hereinabove and illustrated in the accompanying drawing, it will readily occur to those skilled in the art that various modifications and changes may be brought thereto without departing from the scope of the invention as set forth in the appended claims.

What is claimed as new is:

1. Device for coupling together two coaxial rotary shafts and permitting of varying within certain limits the relative angular timing of said shafts under running conditions, notably for driving the valves of internal combustion engines, which comprises a sliding member adapted to move axially in relation to said shafts for varying their relative angular timing, said device further comprising a bevel gear rotatably integral with one shaft, at one end thereof, a pair of toothed segments having bevel teeth in constant meshing engagement with diametrally opposed portions of said bevel gear, said segments being pivoted by means of a diametral pin carried by the other shaft, each bevel-toothed segments being rotatably solid with a lever having a fork-shaped cavity engageable by a driving pin carried by said sliding member, the cavities of said levers being diametrally opposed and disposed on either side of said other shaft, whereby any movement of translation impressed to said sliding member is attended by opposite angular movements of said bevel toothed segments, thus varying the relative angular timing of said shafts.

2. Device according to claim 1, wherein said sliding member is mounted through splines on said one shaft carrying said bevel toothed segments, adjacent said segments.

3. Device according to claim 1, wherein each bevel toothed segment comprises a shank portion opposite the segment teeth and fitted in a cavity formed on the corresponding lever, said shank receiving said diametral pin therethrough, said fork-shaped driving-pin receiving cavity being adjacent and perpendicular to the cavity receiving the corresponding segment shank.

4. Device according to claim 1, wherein said bevel toothed gear is centered to the end portion of the shaft carrying the bevel toothed segments and comprises key means affording a relative angular clearance as a function of the desired maximum angular timing variation.

5. Device according to claim 1, wherein said bevel gear is provided with an integral tenon engaging a diametral slot formed in the adjacent end of the driven shaft.

* * * * *